United States Patent
Zhang et al.

(10) Patent No.: US 10,231,145 B2
(45) Date of Patent: Mar. 12, 2019

(54) SOUNDING REFERENCE SIGNAL BASED SMALL CELL ACTIVITY CONTROL

(71) Applicant: Telefonaktiebolaget LM Ericsson (publ), Stockholm (SE)

(72) Inventors: Hanzhi Zhang, München (DE); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/028,213

(22) PCT Filed: Oct. 9, 2013

(86) PCT No.: PCT/EP2013/071075
§ 371 (c)(1),
(2) Date: Apr. 8, 2016

(87) PCT Pub. No.: WO2015/051837
PCT Pub. Date: Apr. 16, 2015

(65) Prior Publication Data
US 2016/0255529 A1    Sep. 1, 2016

(51) Int. Cl.
*H04W 24/10* (2009.01)
*H04W 36/22* (2009.01)
(Continued)

(52) U.S. Cl.
CPC .......... *H04W 24/10* (2013.01); *H04L 5/0048* (2013.01); *H04W 36/22* (2013.01); *H04W 48/16* (2013.01);
(Continued)

(58) Field of Classification Search
CPC .......................... H04W 24/10; H04W 52/0206
See application file for complete search history.

(56) References Cited

U.S. PATENT DOCUMENTS 6,584,330 B1 *   6/2003   Ruuska ............. H04W 52/0206
                                                    455/574
2006/0013191 A1 *  1/2006   Kavanagh ............. H04L 63/102
                                                    370/349
(Continued)

FOREIGN PATENT DOCUMENTS

WO    WO 2011/083947 A2    7/2011
WO    WO-2012/149968 A1    11/2012

OTHER PUBLICATIONS

International Search Report and Written Opinion of the International Searching Authority, Application No. PCT/EP2013/071075, dated Jul. 1, 2014.
(Continued)

*Primary Examiner* — Dung B Huynh
(74) *Attorney, Agent, or Firm* — Sage Patent Group

(57) ABSTRACT

A mobile network comprises a cell, with one or more subordinate cells having regions that are each located at least partially within a coverage region of the cell. A base station serving the cell receives a measurement report from a further base station. The further base station is operable for serving one of the subordinate cells. The measurement report indicates a result of a measurement performed by the further base station on an uplink reference signal transmitted by a user equipment. On the basis of the measurement report, the base station controls activity of the subordinate cell.

24 Claims, 10 Drawing Sheets

(51) Int. Cl.
  *H04W 52/02* (2009.01)
  *H04L 5/00* (2006.01)
  *H04W 48/16* (2009.01)
  *H04W 72/04* (2009.01)
  *H04W 36/04* (2009.01)
  *H04W 84/04* (2009.01)

(52) U.S. Cl.
  CPC ... *H04W 52/0206* (2013.01); *H04W 72/0413* (2013.01); *H04W 36/04* (2013.01); *H04W 84/045* (2013.01); *Y02D 70/00* (2018.01); *Y02D 70/1242* (2018.01); *Y02D 70/1262* (2018.01)

(56) References Cited

U.S. PATENT DOCUMENTS

| | | | | |
|---|---|---|---|---|
| 2007/0015511 | A1* | 1/2007 | Kwun | H04W 36/30 455/436 |
| 2007/0140160 | A1* | 6/2007 | Lee | H04W 52/143 370/329 |
| 2007/0155391 | A1* | 7/2007 | Kang | H04B 7/026 455/450 |
| 2007/0253385 | A1* | 11/2007 | Li | H04W 16/06 370/338 |
| 2008/0320488 | A1* | 12/2008 | Nakao | G06F 1/3203 718/105 |
| 2009/0258649 | A1* | 10/2009 | Salowey | H04W 4/02 455/435.2 |
| 2009/0264077 | A1* | 10/2009 | Damnjanovic | H04W 52/244 455/63.1 |
| 2010/0075663 | A1* | 3/2010 | Chang | H04L 1/0026 455/424 |
| 2010/0260052 | A1* | 10/2010 | Cho | H04W 48/16 370/241 |
| 2011/0021186 | A1* | 1/2011 | Fischer | H01Q 1/246 455/424 |
| 2011/0116476 | A1* | 5/2011 | Lee | H04W 52/241 370/331 |
| 2011/0136484 | A1* | 6/2011 | Braun | H04W 24/10 455/422.1 |
| 2011/0149769 | A1* | 6/2011 | Nagaraja | H04W 52/12 370/252 |
| 2011/0170466 | A1* | 7/2011 | Kwun | H04W 52/0235 370/311 |
| 2011/0216683 | A1* | 9/2011 | Ju | H04W 52/00 370/311 |
| 2011/0287755 | A1* | 11/2011 | Cho | H04W 52/0225 455/418 |
| 2011/0300887 | A1* | 12/2011 | Osterling | H04W 52/0206 455/507 |
| 2011/0305180 | A1* | 12/2011 | Osterling | H04W 74/006 370/311 |
| 2012/0106349 | A1* | 5/2012 | Adjakple | H04W 52/0206 370/241 |
| 2012/0129566 | A1* | 5/2012 | Lee | H04W 52/146 455/522 |
| 2012/0135753 | A1* | 5/2012 | Wang | H04W 52/0206 455/456.1 |
| 2012/0140652 | A1* | 6/2012 | Pan | H04B 7/15592 370/252 |
| 2012/0165021 | A1* | 6/2012 | Jung | H04W 36/0055 455/437 |
| 2012/0302263 | A1* | 11/2012 | Tinnakornsrisuphap | H04W 64/00 455/456.6 |
| 2012/0329471 | A1* | 12/2012 | Barta | H04W 24/02 455/452.1 |
| 2013/0095748 | A1* | 4/2013 | Hu | H04L 1/0003 455/8 |
| 2013/0095811 | A1* | 4/2013 | Okino | H04W 52/0206 455/418 |
| 2013/0102309 | A1* | 4/2013 | Chande | H04W 52/244 455/435.1 |
| 2013/0194989 | A1* | 8/2013 | Centonza | H04W 52/0206 370/311 |
| 2013/0201966 | A1* | 8/2013 | Weng | H04W 72/04 370/336 |
| 2013/0223317 | A1* | 8/2013 | Kudo | H04W 52/0206 370/311 |
| 2013/0294272 | A1* | 11/2013 | Xiao | H04W 52/0232 370/252 |
| 2013/0310048 | A1* | 11/2013 | Hunukumbure | H04W 52/0206 455/443 |
| 2013/0310058 | A1* | 11/2013 | Ibrahim | H04W 72/082 455/452.1 |
| 2013/0336151 | A1* | 12/2013 | Saitou | H04W 28/08 370/252 |
| 2014/0003239 | A1* | 1/2014 | Etemad | H04W 28/08 370/235 |
| 2014/0080488 | A1* | 3/2014 | Michel | H04W 52/0206 455/436 |
| 2014/0105056 | A1* | 4/2014 | Li | H04W 24/02 370/252 |
| 2014/0153536 | A1* | 6/2014 | Ouchi | H04W 52/146 370/329 |
| 2014/0155078 | A1* | 6/2014 | Balageas | H04W 24/02 455/452.1 |
| 2014/0171140 | A1* | 6/2014 | Iwabuchi | H04W 52/0206 455/522 |
| 2014/0315593 | A1* | 10/2014 | Vrzic | H04W 52/38 455/522 |
| 2014/0362750 | A1* | 12/2014 | Song | H04W 36/0072 370/311 |
| 2015/0009845 | A1* | 1/2015 | Takano | H04W 52/0206 370/252 |
| 2015/0045084 | A1* | 2/2015 | Morimoto | H04W 52/40 455/522 |
| 2015/0049623 | A1* | 2/2015 | Yuk | H04W 36/30 370/252 |
| 2015/0139073 | A1* | 5/2015 | Buchwald | H04W 72/085 370/327 |
| 2015/0201319 | A1* | 7/2015 | Deng | H04W 48/16 455/452.1 |
| 2015/0223135 | A1* | 8/2015 | Ratasuk | H04W 16/32 455/436 |
| 2015/0319688 | A1* | 11/2015 | Matas Sanz | H04W 52/0206 455/574 |
| 2015/0319689 | A1* | 11/2015 | Zhang | H04W 24/02 370/311 |
| 2016/0192262 | A1* | 6/2016 | Comstock | H04W 52/346 370/331 |
| 2016/0255529 | A1* | 9/2016 | Zhang | H04W 36/22 370/329 |
| 2017/0006555 | A1* | 1/2017 | Suzuki | H04W 36/30 |

OTHER PUBLICATIONS

3GPP, Technical Specification—"3rd Generation Partnership Project; Technical Specification Group Radio Access Network; Evolved Universal Terrestrial Radio Access (E-UTRA); Physical channels and modulation (Release 11)", 3GPP TS 36.211 V11.4.0 (Sep. 2013), 120 pp.

3GPP, Technical Specification—"3rd Generation Partnership Project; Technical Specification Group Radio Access Network; Evolved Universal Terrestrial Radio Access Network (E-UTRAN); S1 general aspects and principles (Release 11)", 3GPP TS 36.410 V11.1.0 (Sep. 2013), 15 pp.

3GPP, Technical Specification—"3rd Generation Partnership Project; Technical Specification Group Radio Access Network; Evolved Universal Terrestrial Radio Access Network (E-UTRAN); S1 layer 1 (Release 11)", 3GPP TS 36.411 V11.0.0 (Sep. 2012), 7 pp.

3GPP, Technical Specification—"3rd Generation Partnership Project; Technical Specification Group Radio Access Network; Evolved Universal Terrestrial Radio Access Network (E-UTRAN); S1 signalling transport (Release 11)", 3GPP TS 36.412 V11.0.0 (Sep. 2012), 8 pp.

(56) References Cited

OTHER PUBLICATIONS

3GPP, Technical Specification—"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.3.0 (Mar. 2013), 274 pp.

3GPP, Technical Specification—"3rd Generation Partnership Project; Technical Specification Group Radio Access Network; Evolved Universal Terrestrial Radio Access Network (E-UTRAN); S1 data transport (Release 11)", 3GPP TS 36.414 V11.0.0 (Sep. 2012), 8 pp.

3GPP, Technical Specification—"3rd Generation Partnership Project; Technical Specification Group Radio Access Network; Evolved Universal Terrestrial Radio Access Network (E-UTRAN); X2 general aspects and principles (Release 11)", 3GPP TS 36.420 V11.0.0 (Sep. 2012), 12 pp.

3GPP, Technical Specification—"3rd Generation Partnership Project; Technical Specification Group Radio Access Network; Evolved Universal Terrestrial Radio Access Network (E-UTRAN); X2 layer 1 (Release 11)", 3GPP TS 36.421 V11.1.0 (Dec. 2012), 6 pp.

3GPP, Technical Specification—"3rd Generation Partnership Project; Technical Specification Group Radio Access Network; Evolved Universal Terrestrial Radio Access Network (E-UTRAN); X2 signalling transport (Release 11)", 3GPP TS 36.422 V11.0.0 (Sep. 2012), 8 pp.

3GPP, Technical Specification—"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.6.0 (Sep. 2013), 144 pp.

3GPP, Technical Specification—"3rd Generation Partnership Project; Technical Specification Group Radio Access Network; Evolved Universal Terrestrial Radio Access Network (E-UTRAN); X2 data transport (Release 11)", 3GPP TS 36.424 V11.0.0 (Sep. 2012), 8 pp.

Alcatel-Lucent Shanghai Bell et al., "Small Cell Discovery Performance based on UL Signals", Agenda Item: 6.2.6.2, Document for: Discussion/Decision, 3GPP TSG RAN WG1 Meeting #75, R1-135166, San Francisco, USA, Nov. 11-15, 2013, 8 pp.

CMCC, "Text Proposal on the Switch on Enhancement", Agenda Item: 15.2, Document for: TP, 3GPP TSG-RAN WG3 Meeting #31, R3-131603, Barcelona, Spain, Aug. 19-23, 2013, 3 pp.

Dahlman et al., "4G LTE/LTE-Advanced for Mobile Broadband", Elsevier/Academic Press, 2011, Section 11.2.2—Uplink Sounding References Signals, pp. 217-221.

Huawei et al., "Enhancements of small cell on/off", Agenda Item: 7.2.6.1.1, Document for: Discussion/Decision, 3GPP TSG RAN WG1 Meeting #74, R1-132888, Barcelona, Spain, Aug. 19-23, 2013, 7 pp.

I2R, "eICIC for HeNB UL and MUE DL based on HeNB UL Measurement", Agenda Item: 6.8.2, Document for: Discussion, 3GPP TSG RAN WG1 Meeting #62, R1-104732, Madrid, Spain, Aug. 23-27, 2010, 5 pp.

Qualcomm Incorporated, "Small cell on/off", Agenda Item: 7.2.6.2.1, Document for: Discussion and Decision, 3GPP TSG-RAN WG1 #75bis, R1-134617, Guangzhou, China, Oct. 7-11, 2013, 5 pp.

Communication pursuant to Article 94(3) EPC for European Patent Application No. 13776461.9 dated Jul. 19, 2018, 14 pages.

\* cited by examiner

SOUNDING REFERENCE SIGNAL BASED SMALL CELL ACTIVITY CONTROL

TECHNICAL FIELD

The present invention relates to methods for controlling cell activity in a mobile network and to corresponding devices.

BACKGROUND

To address increasing performance demand in mobile networks, a solution referred to as heterogeneous network deployment may be used to provide an enhanced higher data rate for a given user equipment (UE) and/or to increase the network capacity, e.g., in terms of UEs which may be served in a given coverage region. In such heterogeneous network deployment, it is possible to supplement the coverage region of a base station by one or more further base stations. Such further base stations are also referred to as pico base stations. The pico base stations may be low power nodes with a reduced spatial coverage as compared to primary base stations used for providing basic coverage. In a heterogeneous network deployment such primary radio station is also referred to as macro station. In a heterogeneous network deployment, the cells of the mobile network may be organized in a hierarchical manner: One or more pico cells, each served by a corresponding pico base station, may be located within the coverage region of a macro cell, served by the macro cell. In view of this hierarchical structure, the pico cell(s) may be regarded as subordinate cells, and the macro cell may be regarded as a superordinate cell.

However, usage of additional base stations generally increases energy consumption of the network. Also, the enhancements provided by the additional base stations may not be needed at all times. For example, the traffic load may vary according to a certain pattern: In the business hours the traffic load may be high and during the night the traffic load may be low. In view of energy consumption, it may therefore be beneficial to deactivate pico cells at certain times. Such deactivation may also be performed dynamically, depending on the traffic load.

For example, WO 2011/083947 A1 describes a solution in which a subordinate cell is activated when the traffic load in the superordinate cell exceeds a threshold. The selection of the subordinate cell to activate is based on measurements of downlink channel quality reported by UEs. In this case, the base stations of the subordinate cells need to temporarily transmit downlink signals to allow for the measurement of the downlink channel quality. This may cause frequent switching between modes of these base stations, which may in turn reduce their lifetime. Further, the temporary activation of downlink transmission by these base stations may cause unnecessary power consumption. Moreover, the temporary activation of downlink transmission may cause unnecessary interference. Still further, the measurement reports from the UEs increase the signaling overhead on the uplink radio channel and may require adaptation of control protocols on the radio interface.

Accordingly, there is a need for techniques which allow for efficiently controlling cell activity of subordinate cells in a mobile network.

SUMMARY

According to an embodiment of the invention, a method for cell management in a mobile network is provided. The mobile network comprises a cell, with one or more subordinate cells being at least partially within a coverage region of the cell. According to the method, a base station serving the cell receives a measurement report from a further base station. The further base station is operable for serving one of the subordinate cells. The measurement report indicates a result of a measurement performed by the further base station on an uplink reference signal transmitted by a UE. On the basis of the measurement report, the base station controls activity of the subordinate cell.

According to a further embodiment of the invention, a method for cell management in a mobile network is provided. The mobile network comprises a cell, with one or more subordinate cells being at least partially within a coverage region of the cell. According to the method, a base station operable for serving one of the subordinate cells performs a measurement on an uplink reference signal transmitted by a UE. The base station generates a measurement report indicating a result of the measurement. The base station sends the measurement report to a further base station serving the cell. In response to the measurement report, the base station receives information from the further base station for controlling activity of the subordinate cell.

According to a further embodiment of the invention, base station for a mobile network is provided. The mobile network comprises a cell, with one or more subordinate cells being at least partially within a coverage region of the cell. The base station comprises a radio interface for serving a UE in the cell. Further, the base station comprises a further interface for communication with one or more further base stations operable to serve the subordinate cells. Further, the base station comprises at least one processor. The at least one processor is configured to receive a measurement report from the further base station which is operable to serve one of the subordinate cells. The measurement report indicates a result of a measurement performed by the further base station on an uplink reference signal transmitted by a UE. Further, the at least one processor is configured to control activity of the subordinate cell. This is accomplished on the basis of the measurement report.

According to a further embodiment of the invention, base station for a mobile network is provided. The mobile network comprises a cell, with one or more subordinate cells being at least partially within a coverage region of the cell. The base station comprises a radio interface for serving a UE in one of the subordinate cells. Further, the base station comprises a further interface for communication with a further base station serving the cell. Further, the base station comprises at least one processor. The at least one processor is configured to perform a measurement on an uplink reference signal transmitted by a UE. Further, the at least one processor is configured to generate a measurement report indicating a result of the measurement. Further, the at least one processor is configured to send the measurement report to a further base station serving the cell and, in response to the measurement report, receive information from the further base station for controlling activity of the subordinate cell.

According to a further embodiment of the invention, a computer program is provided. The computer program comprises program code to be executed by at least one processor of a base station for a mobile network comprising a cell with one or more subordinate cells at least partially within a coverage region of the cell. Execution of the program code causes the at least one processor to receive a measurement report from a further base station which is operable to serve one of the subordinate cells. The measurement report indicates a result of a measurement performed by the further base station on an uplink reference signal transmitted by a UE. Further, execution of the program code caused the at least one processor to control activity of the subordinate cell. This is accomplished on the basis of the measurement report.

According to a further embodiment of the invention, a computer program is provided. The computer program comprises program code to be executed by at least one processor of a base station for a mobile network comprising a cell with one or more subordinate cells at least partially within a coverage region of the cell. Execution of the program code causes the at least one processor to perform a measurement on an uplink reference signal transmitted by a UE. Further, execution of the program code causes the at least one processor to generate a measurement report indicating a result of the measurement. Further, execution of the program code causes the at least one processor to send the measurement report to a further base station serving the cell and, in response to the measurement report, receive information from the further base station for controlling activity of the subordinate cell.

DETAILED DESCRIPTION OF EMBODIMENTS

In the following, concepts in accordance with exemplary embodiments of the invention will be explained in more detail and with reference to the accompanying drawings.

The illustrated embodiments relate to concepts for controlling cell activity a mobile network. The embodiments specifically refer to a scenario in which the coverage regions of one or more subordinate cells are at least partially located within the coverage region of a superordinate cell. More specifically, the embodiments relate to a heterogeneous deployment using the LTE (Long Term Evolution) radio access technology specified by 3GPP ($3^{rd}$ Generation Partnership Project), in which the subordinate cells are served by LTE base stations referred to as pico eNB, and the superordinate cell is served by an LTE base station referred to as macro eNB. However, it should be understood that the concepts could also be applied in connection with other network deployments, e.g., using other radio access technologies such as the UMTS (Universal Mobile Telecommunications System) radio access technology specified by 3GPP.

Figure 1:
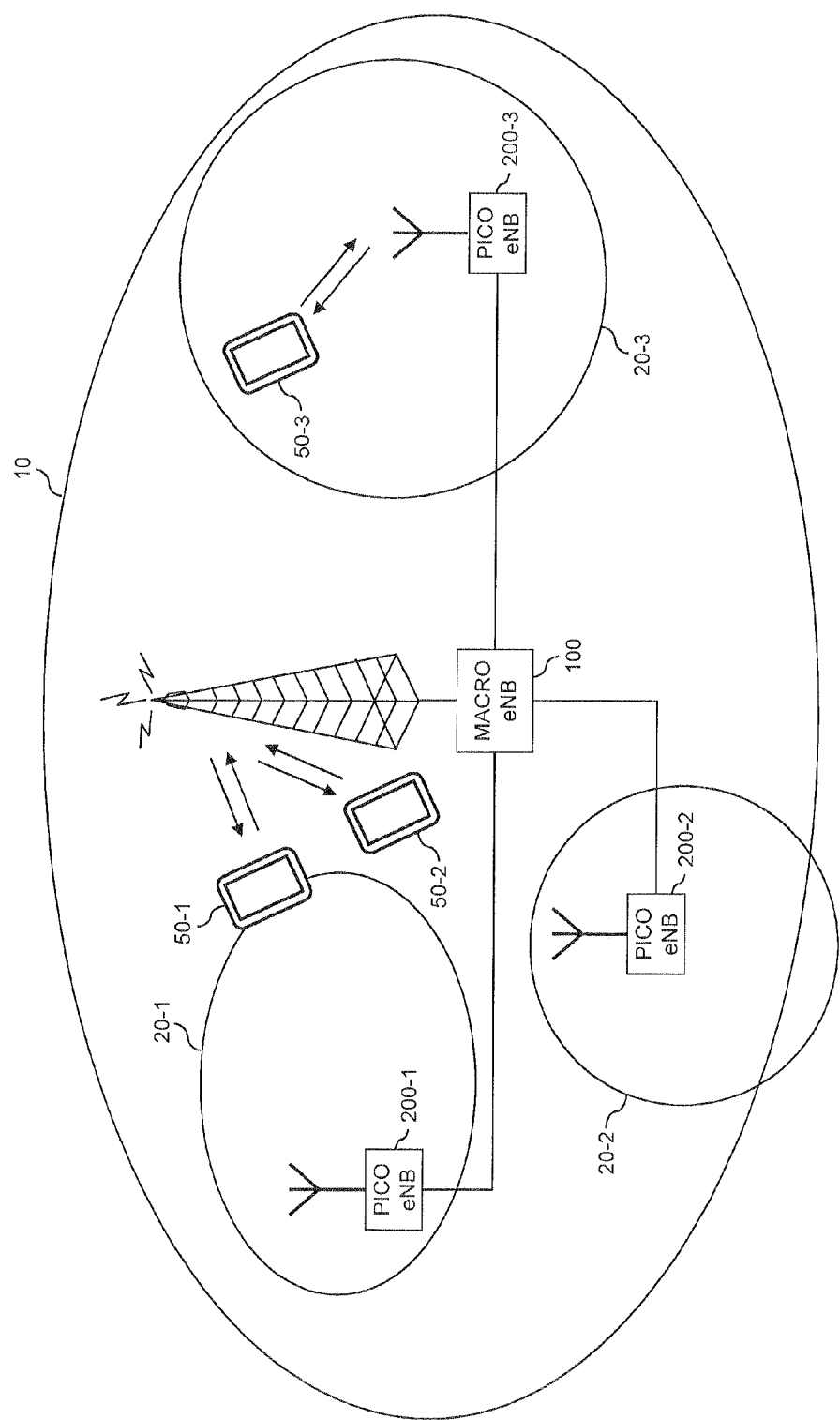
FIG. 1 schematically illustrates a heterogeneous network deployment in which cell activity management of subordinate cells within the coverage region of a superordinate cell is implemented according to an embodiment of the invention.

FIG. 1 schematically illustrates an exemplary cell 10 of the mobile network and multiple UEs 50-1, 50-2, 50-3 which are connected to the cell 10. The UEs 50-1, 50-2, 50-3 may be mobile phones, portable computers, or some other type of UE. A number of further cells 20-1, 20-2, 20-3 are located at least partially within a coverage region of the cell 10. Accordingly, a hierarchical structure is used, in which the cell 10 is a superordinate cell and the further cells 20-1, 20-2, 20-3 are subordinate cells. The cell 10 is served by a base station 100, and its subordinate cells 20-1, 20-2, 20-3 are served by base stations 200-1, 200-2, 200-3, respectively. In accordance with the illustrated LTE scenario, the base stations 100, 200-1, 200-2, 200-3 are implemented as eNBs. In the illustrated heterogeneous network deployment, the base stations 200-1, 200-2, 200-3 serving the subordinate cells 20-1, 20-2, 20-3 may be implemented as low-power nodes having a lower transmit power than the base station 100 serving the cell 10. The base station 100 will in the following also be referred to as macro eNB, designating a normal power base station serving the superordinate cell 10, and the base stations 200-1, 200-2, 200-3 will be referred to as pico eNBs, designating low power base stations located in the coverage area of the superordinate cell 10. In the illustrated heterogeneous deployment, the superordinate cell 10 may also be referred to as macro cell, and the subordinate cells 20-1, 20-2, 20-3 may also be referred to as pico cells.

The macro eNB 100 may be used to provide basic coverage, while the pico cells 20-1, 20-2, 20-3 may be used within the coverage region of the cell 10 to enhance data rate provided to the UEs 50-1, 50-2, 50-3 and/or network capacity by serving one or more of the UEs in the pico cells 20-1, 20-2, 20-3. As illustrated by way of example for the pico cell 20-2, the coverage region of such subordinate cells may also extend beyond the coverage region of the superordinate cell.

As further illustrated, the base stations 100, 200-1, 200-2, 200-3 are connected to each other to allow communication between the base stations 100, 200-1, 200-2, 200-3. In accordance with the illustrated LTE scenario, these connections may be implemented by the X2 interface as specified in 3GPP Technical Specification (TS) 36.420 V11.0, 3GPP TS 36.421 V11.1, 3GPP TS 36.422 V11.0, 3GPP TS 36.423 V11.6, and 3GPP TS 36.424 V11.0. Further, the base stations may each be provided with a backhaul connection to a core network (not illustrated in FIG. 1), which may be implemented by the S1 interface as specified in 3GPP TS 36.410 V11.1, 3GPP TS 36.411 V11.0, 3GPP TS 36.412 V11.0, 3GPP TS 36.413 V11.5, and 3GPP TS 36.414 V11.0.

In the illustrated concepts, the subordinate cells may be dynamically activated or deactivated, thereby allowing on the one hand to achieve high capacity and/or data rates and on the other hand to avoid excessive energy consumption or interference by the subordinate cells. As a general rule, activation or deactivation of a subordinate cells may therefore be controlled depending on the traffic load of the superordinate cell. If the traffic load is high, one or more of the subordinate cells may be activated, and if the traffic load is low, the subordinate cells may be deactivated.

In the illustrated concepts, the decision whether to activate or deactivate a certain subordinate cell is based on measurements of uplink reference signals transmitted by one or more UEs. Such measurements are performed by the base station serving the subordinate cell and then reported to the base station serving the superordinate cell. The latter base station may then evaluate the reported measurement and decide whether activation or deactivation of the subordinate cell is appropriate. In particular, it may select the most suitable subordinate cell(s) for activation. This is possible because the measurement of the uplink reference signals indicates a channel quality which the UE experiences when being served in the subordinate cell. The reported measurements therefore allow for efficiently selecting the subordinate cell(s) for activation which provide(s) the best channel quality for serving UEs. For example, in the scenario as illustrated in FIG. 1 it may be preferable to activate the pico cells 20-1 and 20-3 because they offer better channel quality for the UEs 50-1, 50-2, 50-3 than the pico cell 20-2.

For the above measurements performed by the base station of the subordinate cell, reference signals may be used which are specific for the UE. In this way, it becomes possible to assess whether the subordinate cell is suited to serve a particular UE, and to compare the suitability to other subordinate cells. In the illustrated LTE scenario, uplink reference signals referred to as Sounding Reference Signal (SRS) may be used to perform the measurements. Specifically a signal strength of the SRS may be measured, e.g., in terms of a Reference Signal Received Power (RSRP) or Received Signal Strength Indicator (RSSI).

As specified in 3GPP TS 36.211 V11.4, the UE regularly transmits the SRS. The SRS is typically used by the eNB to estimate the uplink channel quality at different frequencies, which may then be used for efficiently assigning resource blocks for uplink data transmission. Assuming reciprocity between downlink and uplink, the measurement of the SRS may also be used for estimating the downlink channel quality (or overall channel quality). The UE may be configured to transmit the SRS periodically, or to perform the SRS transmission in response to downlink control information from the eNB. In each case, the SRS will be transmitted in last OFDM (Orthogonal Frequency Division Multiplexing) symbol of a subframe.

Figure 2:
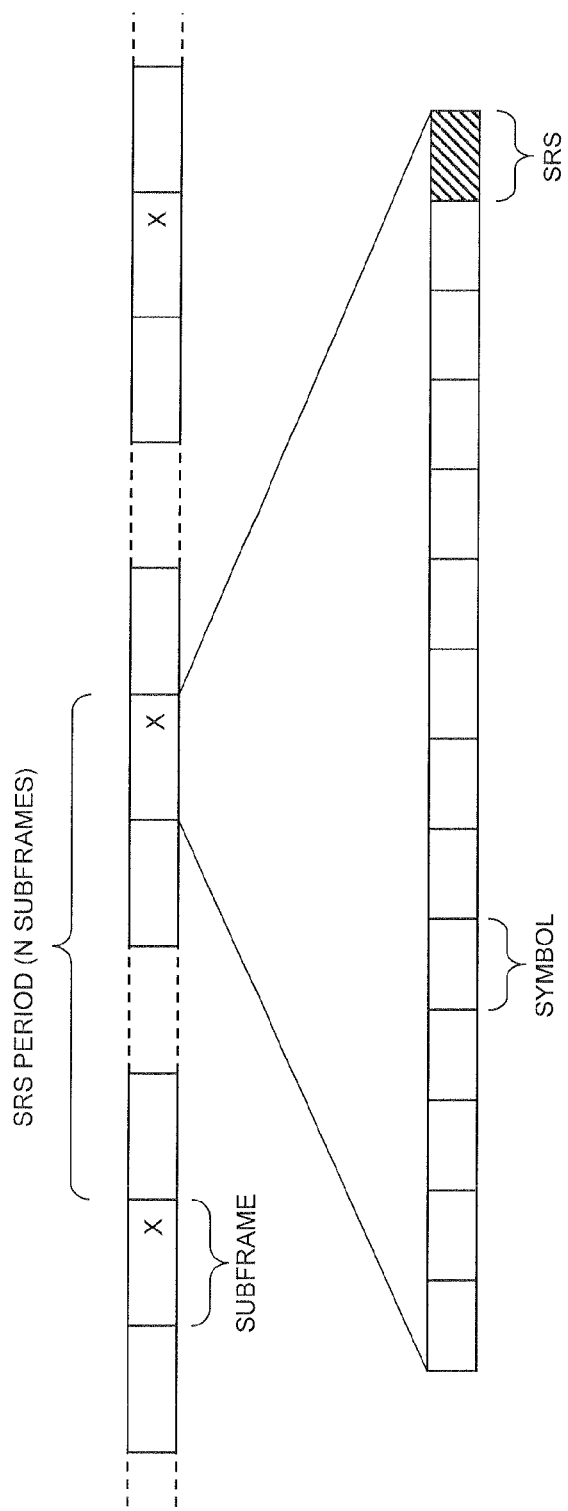
FIG. 2 schematically illustrates an exemplary uplink radio frame structure which may be utilized in an embodiment of the invention.

FIG. 2 schematically illustrates an exemplary uplink radio frame structure which may be used in the LTE radio access technology. As can be seen, the radio frame is organized into subframes (typically of 1 ms duration). Each subframe includes a number of OFDM symbols (in the illustrated example 14 OFDM symbols). Subframes marked by "X" are assumed to include the SRS. In these subframes, the SRS is transmitted in the last OFDM symbol. Parameters of the SRS transmission, such as the SRS period, i.e., the number of subframes after which the UE transmits a subframe with the SRS, or a transmission bandwidth of the SRS, may be configured by the eNB, using Radio Resource Control (RRC) procedures. This may be accomplished in such a way that the SRS of different UEs can be distinguished from each other. For example, the eNB could set the SRS parameters in such a way that different UEs transmit the SRS in different subframes, and/or on different frequencies.

In the illustrated concepts, activity of the pico cells 20-1, 20-2, 20-3 may for example be controlled as follows: When the traffic load in the macro cell 10 is above a threshold $\alpha$ (e.g., 70% of the total capacity of the macro cell 10), the macro eNB 100 may request the pico eNBs of inactive pico cells in the coverage area of the macro cell 10 to monitor the SRS transmitted by the UEs in the cell 10. For example, when assuming that all the pico cells 20-1, 20-2, 20-3 are inactive and the UEs 50-1, 50-2, 50-3 are served in the macro cell 10, the macro eNB 100 may request the pico eNBs 200-1, 200-2, 200-3 to monitor the SRS transmitted by the UEs 50-1, 50-2, 50-3. The pico eNBs 200-1, 200-2, 200-3 may then measure the RSRP of the SRS and report the measured RSRP or RSSI to the macro eNB 100, typically in a UE specific manner, e.g., by also indicating the identity of the UE which transmitted the SRS. The macro eNB 100 may then map each UE 50-1, 50-2, 50-3 to the most suitable pico cell 20-1, 20-2, 20-3, i.e., to the pico cell 20-1, 20-2, 20-3 for which the pico eNB 200-1, 200-2, 200-3 reports the highest RSRP of the SRS. For example, such mapping may be kept in a table or other database maintained by the macro eNB 100, which is updated according to the received measurement reports. In accordance with the mapping, the macro eNB 100 may select one or more of the pico cells 20-1, 20-2, 20-3 for activation. For example, the eNB 100 could select the pico cell 20-1, 20-2, 20-3 to which the highest number of UEs is mapped. In the scenario as illustrated in FIG. 1, this could be the pico cell 20-1. An example of a corresponding process is illustrated in FIG. 3.

Figure 4:
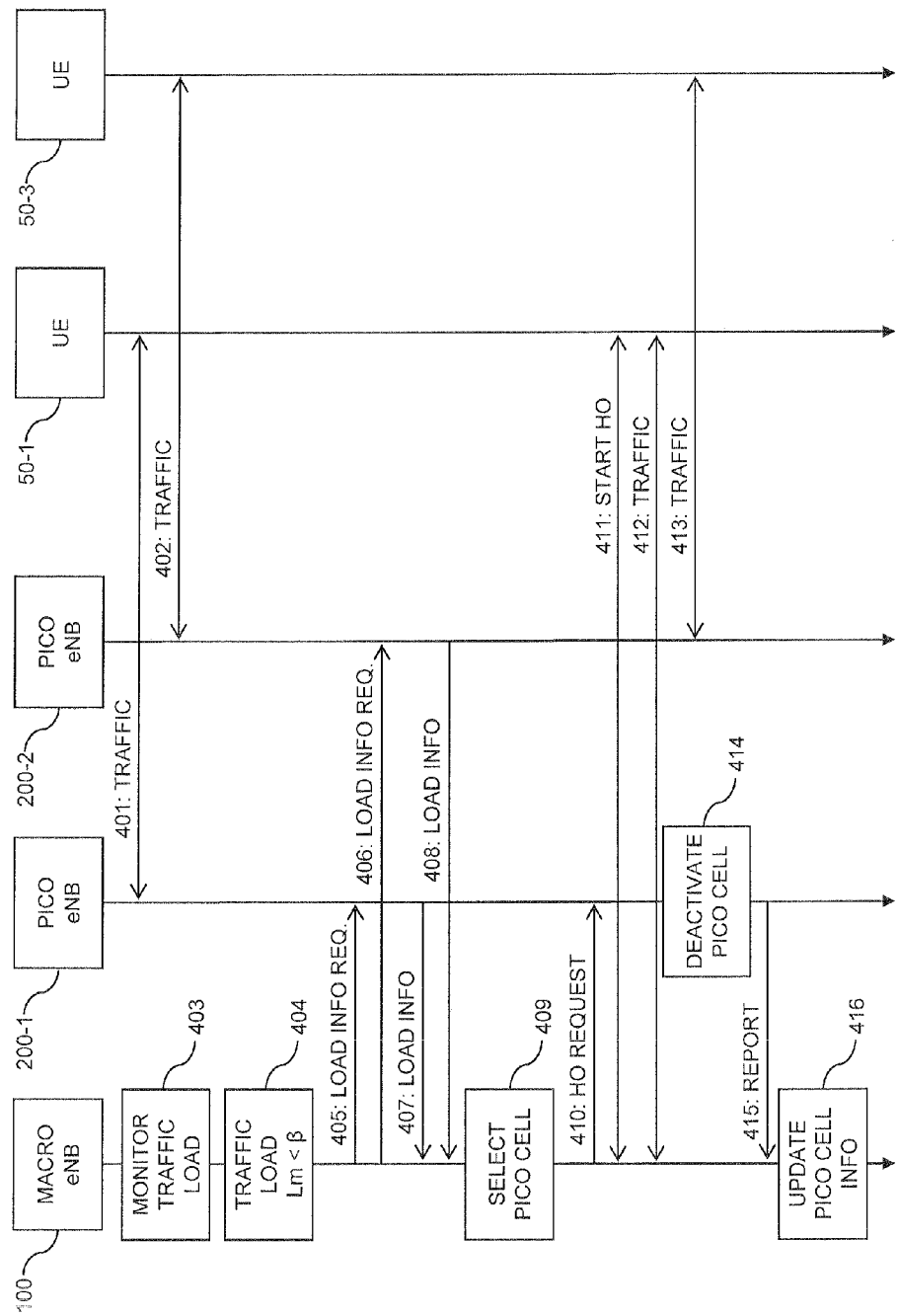
FIG. 4 shows a signaling diagram for illustrating an exemplary cell activity control process according to an embodiment of the invention, in which deactivation of an active subordinate cell is triggered by the traffic load in the superordinate being below a threshold value.

When assuming that some pico cells are already activated and exchanging data with UEs, such pico cells may also be deactivated. This may be triggered by the traffic load in the macro cell 10 falling below a threshold $\beta$ (e.g., 20% of the total capacity of the macro cell 10), it may request that the pico eNBs of the active pico cells report the traffic load in their pico cell. If the lowest reported traffic load is below a threshold $\gamma$ (e.g., 30% of the total capacity of the pico cell), the macro eNB 100 may instruct the pico eNB of this pico cell to stop accepting new UEs and start a handover (HO) of its served UEs to the macro cell 10. When the UEs in the pico cell have been handed over, the pico cell may be deactivated. An example of a corresponding process is illustrated in FIG. 4.

Figure 5:
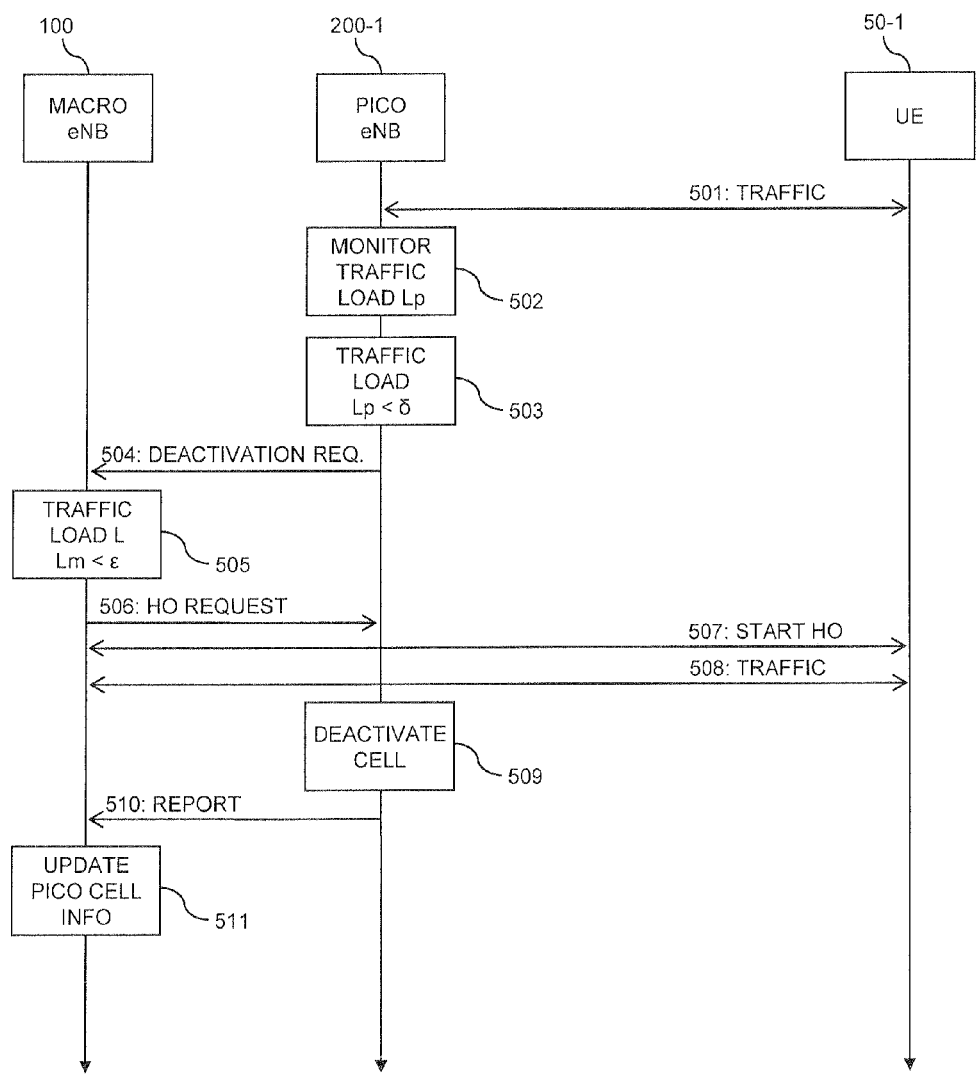
FIG. 5 shows a signaling diagram for illustrating an exemplary cell activity control process according to an embodiment of the invention, in which deactivation of an active subordinate cell is triggered by the traffic load in the subordinate being below a threshold value.

Further, deactivation of an active pico cell may also be triggered by the traffic load in the pico cell falling below a threshold $\delta$ (e.g., 25% of the total capacity of the pico cell). The pico eNB serving this pico cell may then request deactivation from the macro eNB 100. If the traffic load in the macro cell 10 is below a threshold $\epsilon$ (e.g., 25% of the total capacity of the macro cell 10), the macro eNB 100 may accept the requested deactivation and instruct the pico eNB to stop accepting new UEs and start a HO of its served UEs to the macro cell 10. When the UEs in the pico cell have been handed over, the pico cell may be deactivated. An example of a corresponding process is illustrated in FIG. 5.

Figure 3:
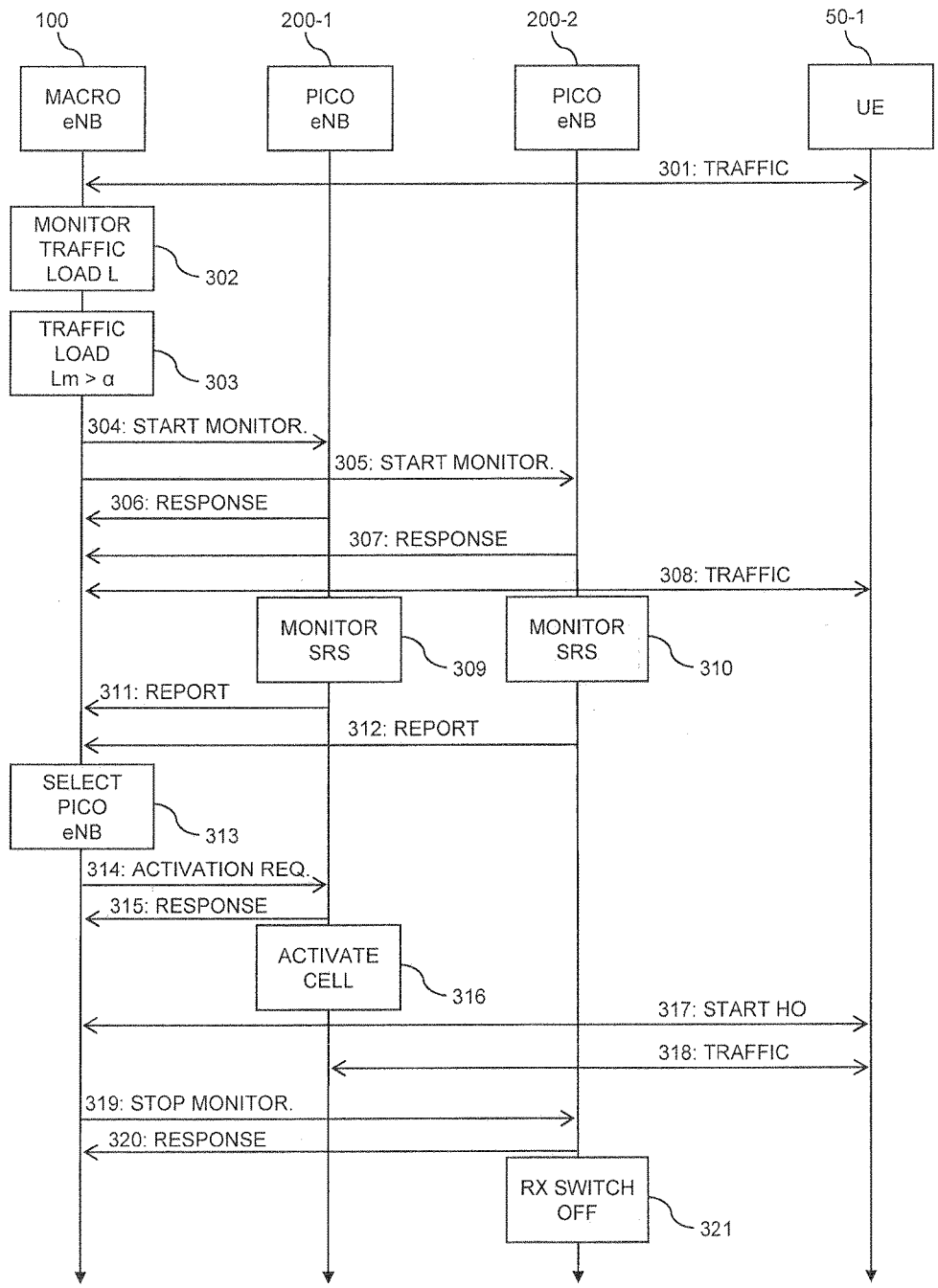
FIG. 3 shows a signaling diagram for illustrating an exemplary cell activity control process according to an embodiment of the invention, in which an inactive subordinate cell is activated.

The exemplary process of FIG. 3 involves the macro eNB 100, the pico eNB 200-1, the pico eNB 200-2, and the UE 50-1. The pico cells 20-1, 20-2 of the pico eNBs 200-1, 200-2 are assumed to be initially deactivated. The UE 50-1 is assumed to be served by the macro eNB 100, i.e., in the macro cell 10. In this state, as illustrated by 301, traffic may be exchanged between the macro eNB 100 and the UE 50-1.

As illustrated by step 302, the macro eNB 100 monitors the traffic load Lm in the macro cell 10. At step 303, the traffic load Lm is found to above the threshold $\alpha$, e.g., of 30% of the total capacity of the macro cell 10. This causes the macro eNB 100 to instruct the pico eNBs 200-1, 200-2 of the inactive pico cells 20-1, 20-2 to start monitoring the SRS transmitted by the UE 50-1. This is accomplished by sending a start monitoring command 304 to the pico eNB 200-1 and by sending a start monitoring command 305 to the pico eNB 200-2. The start monitoring commands 304, 305 may also indicate additional information, such as the UE identity, e.g., in terms of an IMSI (International Mobile Subscriber Identity), time domain position of SRS (in terms of absolute time or subframe offset), or frequency domain position of SRS, or SRS transmission bandwidth, as configured for the UE 50-1. The start monitoring commands 304, 305 may be sent over the X2 interface between the macro eNB 100 and the respective pico eNB 200-1, 200-2.

By sending responses 306, 307, the pico eNBs 200-1, 200-2 may acknowledge receipt of the start monitoring command 304, 305 and confirm to the macro eNB 100 that the SRS of the UE 50-1 will be monitored. The responses 306, 307 may be sent over the X2 interface between the macro eNB 100 and the respective pico eNB 200-1, 200-2.

As indicated by steps 309, 310, the pico eNBs 200-1, 200-2 then monitor the SRS transmitted by the UE 50-1. For this purpose, they may utilize a power efficient SRS monitoring mode, which does not require utilization of all components of the pico eNB 200-1, 200-2. Specifically, transmit circuitry of the pico eNB 200-1, 200-2 may be inactive in the SRS monitoring mode. Further, also a baseband processing part of the pico eNB 200-1, 200-2 may be inactive in the SRS monitoring mode. Still further, receive circuitry needed for monitoring the SRS may be active only temporary, as required for monitoring the SRS which is transmitted only in the last OFDM symbol of a subframe, and only in certain subframes as defined by the SRS parameters of the UE 50-1. During other subframes and during other OFDM symbols, the receive circuitry may be inactive. The information indicated in the start monitoring commands 304, 305, e.g., the UE identity, time domain position of SRS, or frequency domain position of SRS, may be used by the pico eNB 200-1, 200-2 for distinguishing between SRS of different UEs. If the SRS parameters indicated by the macro eNB 100 include the SRS transmission bandwidth, the pico eNB 200-1, 200-2 may use this information for efficiently setting a measurement window.

Having performed the measurements, the pico eNBs 200-1, 200-2 report the result of the measurement to the macro eNB 100. This is accomplished by the pico eNB 200-1 sending measurement report 311 to the macro eNB 100, and by the pico eNB 200-2 sending measurement report 312 to the macro eNB 100. The measurement reports 311, 312 may indicated the measured signal strength of the SRS, e.g., in terms of a RSRP or RSSI. The measurement reports 311, 312 may be sent over the X2 interface between the macro eNB 100 and the respective pico eNB 200-1, 200-2.

On the basis of the measurement reports 311, 312, the macro eNB 100 may then select a pico cell 20-1, 20-2 for activation, as indicated by step 313. In the illustrated example, the macro eNB 100 may select that one of the pico cell 20-1, 20-1 for which the highest signal strength of the SRS was reported, which is assumed to be the pico cell 20-1 of the pico eNB 200-1.

Accordingly, the macro eNB 100 may then activate the pico cell 20-1, which is accomplished by sending activation request 314 to the pico eNB 200-1. As illustrated, the pico eNB 200-1 may then acknowledge receipt of the activation request 314 and confirm that it will activate the pico cell 20-1, by sending response 315. The activation request 314 and the response 315 may be sent over the X2 interface between the macro eNB 100 and the pico eNB 200-1.

At step 316, the pico eNB 200-1 activates the pico cell 20-1. This may be accomplished by switching from the SRS monitoring mode into normal operation for serving the pico cell 20-1.

The macro eNB 100 and the UE 50-1 then start a HO of the UE 50-1 from the macro cell 10 to the activated pico cell 20-1, as indicated by 317. This may be accomplished using the conventional HO mechanism and for example be triggered by channel quality measurements performed by the UE 50-1. Having completed the HO, the UE 50-1 is served in the pico cell 20-1 and may exchange traffic with the pico eNB 200-1, as indicated by 318.

As further illustrated, the macro eNB 100 may also instruct the pico eNB 200-2 to stop monitoring the SRS, by sending a stop monitoring command 319 to the pico eNB 200-2. By sending response 320, the pico eNB 200-2 may also acknowledge receipt of the stop monitoring command 319 and confirm to the macro eNB 100 that it stops monitoring the SRS. The stop monitoring command 319 and the response 320 may be sent over the X2 interface between the macro eNB 100 and the pico eNB 200-2.

As indicated by step 321, the pico eNB 200-1 may then stop monitoring the SRS and completely switch off its receive circuitry to save energy.

The exemplary process of FIG. 4 involves the macro eNB 100, the pico eNB 200-1, the pico eNB 200-2, the UE 50-1, and the UE 50-3. Initially, the pico cells 20-1, 20-3 of the pico eNBs 200-1, 200-3 are assumed to be already activated. The UE 50-1 is assumed to be served by the pico eNB 200-1, i.e., in the pico cell 20-1. The UE 50-3 is assumed to be served by the pico eNB 200-3, i.e., in the pico cell 20-3. In this state, as illustrated by 401 and 402, traffic may be exchanged between the pico eNB 200-1 and the UE 50-1, and between the pico eNB 200-3 and the UE 50-3. Other UEs may be served as well. For example, the UE 50-2 (not illustrated in FIG. 4) could be served in the macro cell 10.

As illustrated by step 403, the macro eNB 100 monitors the traffic load Lm in the macro cell 10. At step 404, the traffic load Lm is found to below the threshold β, e.g., of 20% of the total capacity of the macro cell 10. This causes the macro eNB 100 to instruct the pico eNBs 200-1, 200-3 of the active pico cells 20-1, 20-3 to provide information on the traffic load in their respective pico cell 20-1, 20-3. This is accomplished by sending a load information request 405 to the pico eNB 200-1 and by sending a load information request 406 to the pico eNB 200-3. The load information requests 405, 406 may be sent over the X2 interface between the macro eNB 100 and the respective pico eNB 200-1, 200-3.

By sending responses 407, 408, the pico eNBs 200-3, 200-4 provide the requested information on the traffic load. The responses 407, 408 may be sent over the X2 interface between the macro eNB 100 and the respective pico eNB 200-1, 200-3.

On the basis of the reported traffic load information, the macro eNB 100 may then select a pico cell 20-1, 20-3 for deactivation, as indicated by step 409. In particular, the macro eNB 100 may select that one of the pico cells 20-1, 20-3 for which the lowest traffic load was reported. Further, it may also check whether this lowest traffic load is below the threshold γ, e.g., of 30% of the total capacity of the pico cell. The latter check may avoid that the macro cell 10 becomes overloaded by the expected additional traffic load due to deactivation of the selected pico cell. Other criteria may be considered as well when selecting the pico cell to be deactivated, e.g., reported SRS measurements as used in the process of FIG. 3 to allow selecting a pico cell for deactivation which is least suitable for serving UEs. In the exemplary process of FIG. 4, it is assumed that the pico cell 20-1 is selected for deactivation.

Accordingly, the macro eNB 100 may then deactivate the pico cell 20-1, which is accomplished by sending HO request 410 to the pico eNB 200-1. The HO request 410 may be sent over the X2 interface between the macro eNB 100 and the pico eNB 200-1. The HO request 410 causes the pico eNB 200-1 to stop accepting new UEs in the pico cell 20-1 and to enforce a HO of the UEs in the pico cell 20-1 to other cells, in particular to the macro cell 10. As a result, as illustrated by 411, the macro eNB 100 and the UE 50-1 start a HO of the UE 50-1 to the macro cell 10. Having completed the HO, the UE 50-1 is served in the macro cell 10 and may exchange traffic with the macro eNB 100, as indicated by 412. The UE 50-3 is still served by the pico cell 20-3 and may exchange traffic with the pico eNB 200-3, as illustrated by 413.

If multiple UEs need to be handed over from the pico cell 20-1, the pico eNB 200-1 may perform a check of each UE's current transmission buffer estimate a time until finishing of the transmission. The HO processes of the different UEs may then be performed sequentially, in the order of largest time until finishing the transmission being handled first. In this way, the overall time for finishing the HO processes can be reduced without adversely affecting performance of a UE.

At step 414, the pico eNB 200-1 deactivates the pico cell 20-1. This may be accomplished by switching from the normal operation for serving the pico cell 20-1 to an inactive mode, in which receive circuitry, transmit circuitry, and a baseband part of the pico eNB 200-1 are inactive to save energy. However, components of the pico eNB 200-1 which are needed for communication with the macro eNB 100 remain active.

Having deactivated the pico cell 20-1, the pico eNB 200-1 sends a report 415 to the macro eNB 100 to confirm deactivation of the pico cell 20-1. The report 415 may be sent over the X2 interface between the macro eNB 100 and the pico eNB 200-1. The macro eNB 100 may then perform a corresponding update of its information concerning the activity of pico cells, as indicated by step 416.

The exemplary process of FIG. 5 involves the macro eNB 100, the pico eNB 200-1, and the UE 50-1. Initially, the pico cell 20-1 of the pico eNBs 200-1 is assumed to be already activated. The UE 50-1 is assumed to be served by the pico eNB 200-1, i.e., in the pico cell 20-1. In this state, as illustrated by 501, traffic may be exchanged between the pico eNB 200-1 and the UE 50-1. Other UEs may be served as well. For example, the UE 50-2 (not illustrated in FIG. 5) could be served in the macro cell 10, and the UE 50-3 (not illustrated in FIG. 5) could be served in the pico cell 20-3.

As illustrated by step 502, the pico eNB 200-1 monitors the traffic load Lp in the pico cell 200-1. At step 503, the traffic load Lp is found to below the threshold δ, e.g., of 25% of the total capacity of the pico cell 20-1. This causes the pico eNB 200-1 to request deactivation of the pico cell 20-1 from the macro eNB 100. This is accomplished by sending deactivation request 504 to the macro eNB 100. The deactivation request 504 may be sent over the X2 interface between the macro eNB 100 and the pico eNB 200-1.

The macro eNB 100 may then check whether the traffic load Lm in the macro cell 10 allows for deactivating the pico cell 20-1. For this purpose, the macro eNB 100 may compare the traffic load Lm in the macro cell 10 to the threshold ε, e.g., of 35% of the total capacity of the macro cell 10.

If it is found that the traffic load Lm is below the threshold ε, as indicated by step 505, the macro eNB 100 may initiate deactivation of the pico cell 20-1. This is accomplished by sending HO request 506 to the pico eNB 200-1. The HO request 506 may be sent over the X2 interface between the macro eNB 100 and the pico eNB 200-1. The HO request 506 causes the pico eNB 200-1 to stop accepting new UEs in the pico cell 20-1 and to enforce a HO of the UEs in the pico cell 20-1 to other cells, in particular to the macro cell 10. As a result, as illustrated by 507, the macro eNB 100 and the UE 50-1 start a HO of the UE 50-1 to the macro cell 10. Having completed the HO, the UE 50-1 is served in the macro cell 10 and may exchange traffic with the macro eNB 100, as indicated by 508.

At step 509, the pico eNB 200-1 deactivates the pico cell 20-1. This may be accomplished by switching from the normal operation for serving the pico cell 20-1 to an inactive mode, in which typically receive circuitry, transmit circuitry, and a baseband part of the pico eNB 200-1 are inactive to save energy. However, components of the pico eNB 200-1 which are needed for communication with the macro eNB 100 remain active.

If multiple UEs need to be handed over from the pico cell 20-1, the pico eNB 200-1 may perform a check of each UE's current transmission buffer estimate a time until finishing of the transmission. The HO processes of the different UEs may then be performed sequentially, in the order of largest time until finishing the transmission being handled first. In this way, the overall time for finishing the HO processes can be reduced without adversely affecting performance of a UE.

Having deactivated the pico cell 20-1, the pico eNB 200-1 sends a report 510 to the macro eNB 100 to confirm deactivation of the pico cell 20-1. The report 510 may be sent over the X2 interface between the macro eNB 100 and the pico eNB 200-1. The macro eNB 100 may then perform a corresponding update of its information concerning the activity of pico cells, as indicated by step 511.

As indicated above, the dynamic control of cell activity using the uplink reference signal may be performed in a highly efficient manner, because monitoring of the uplink reference signal requires only temporary activation of certain components of the pico eNB. This will be further explained by referring to an exemplary architecture of the pico eNB as schematically illustrated in FIG. 6.

Figure 6:
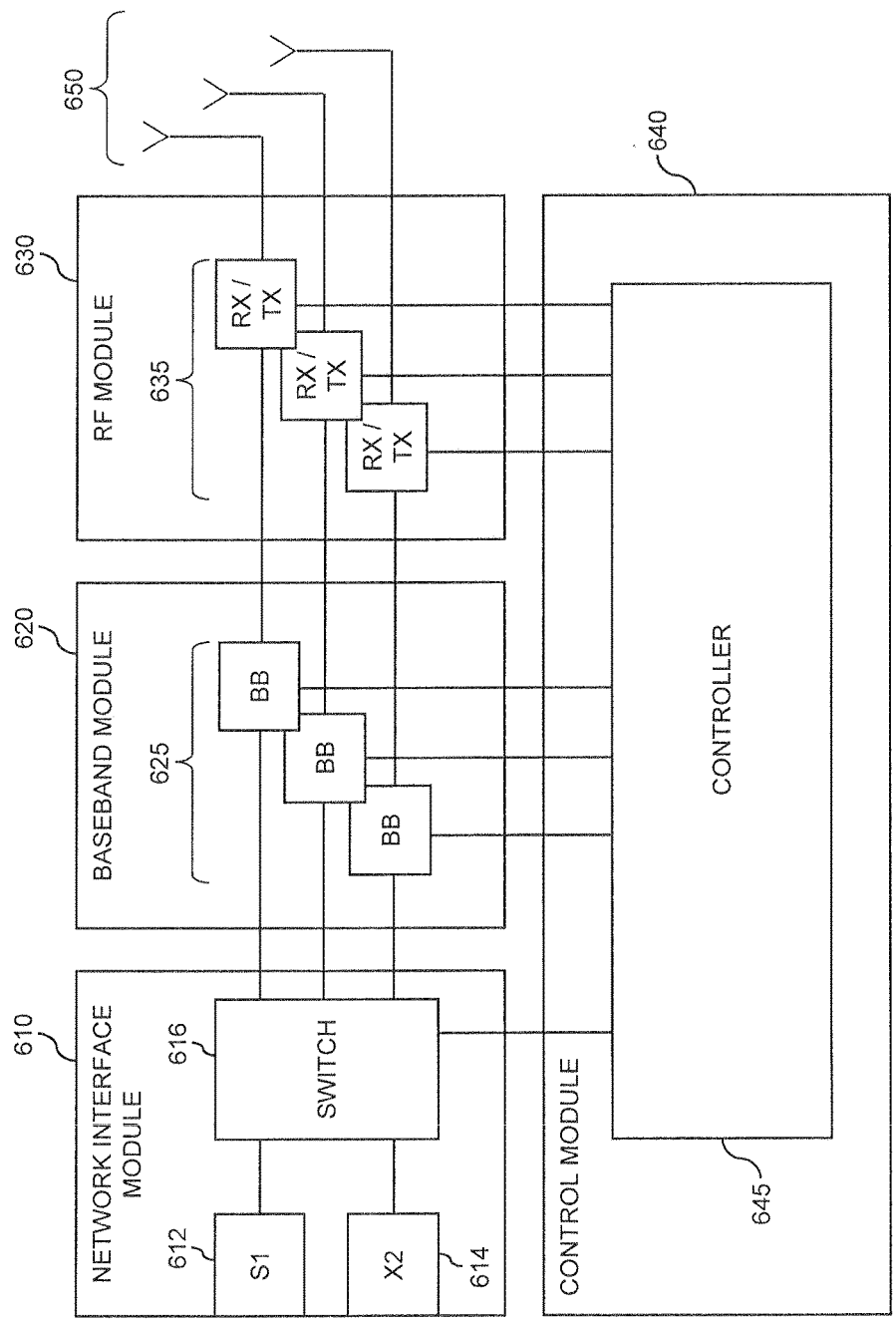
FIG. 6 schematically illustrates an architecture of a base station which may be utilized in an embodiment of the invention.

As shown in FIG. 6, the pico eNB is provided with a network interface module 610 for network connectivity, a baseband module 620 for digital signal processing, a radio frequency (RF) module 630 for sending and transmitting RF signals, and a control module 640 for various control purposes.

The network interface module 610 has the purpose of providing connectivity of the pico eNB to the rest of the mobile network, e.g., to the core network and to other eNBs. For this purpose, the network interface module implements an S1 interface 612, which may be used for communication with the core network, and an X2 interface 614, which may be used for communication with other eNBs. The S1 interface 612 and the X2 interface 614 may be used for sending or receiving user plane data. Further, the S1 interface 612 and the X2 interface 614 may be used for sending or receiving control plane data. A switch 616 may be provided for routing the control plane data to or from the control module 640.

The baseband module 620 is responsible for digital signal processing for generating the RF signals to be transmitted and for digital signal processing of received RF signals. This signal processing includes upconversion into the RF frequency range, downconversion from the RF frequency range, filtering, Fast Fourier Transformation (FFT) and inverse FFT (IFFT) for OFDM, modulation, demodulation, pre-distortion, signal detection (synchronization, channel estimation, equalization, channel compensation, coding, decoding, and the like. In the illustrated example, the baseband module 620 includes a number of baseband units (BB) 625 for providing multiple transmit/receive chains.

The RF module 630 provides transmitter (TX) and receiver (RX) units 635 for sending and receiving RF signals over antennas 650. In some implementations, the receive circuitry of the TX/RX units 635 may be activated and deactivated separately from the transmit circuitry of the TX/RX units 635, thereby allowing for efficient implementation of the SRS monitoring mode.

The control module 640 is provided with a controller 645 which coordinates operation of the network interface module 610, the baseband module 620, and the RF module 630. This may be accomplished in accordance with control plane data received over the network interface module 610. Further, the controller 645 may also send control plane data over the network interface module 610, such as the above-mentioned measurement reports.

In the above-mentioned SRS monitoring mode, the baseband module 620 may be inactive, and the controller 645 in the control module may interact with the RF module 630 to perform the measurements. For this purpose, only receive circuitry in the RF module (of one or more RX/TX units 635) needs to be activated temporarily, at times when an SRS transmission is expected.

In realistic scenarios, multiple UEs will be served in the macro cell 10 which typically have different expected channel qualities in the pico cells. Accordingly, further evaluation beyond comparison of two signal strengths may be needed for selection of the most appropriate pico cell(s) for activation.

In some implementations, the SRS measurements may be performed for only a given subset of the UEs which are currently served in the macro cell. For this subset UEs may be selected which still have sufficient data to send or receive and therefore are not likely to terminate transmission in the near future (which would also mean that no SRS is transmitted by such UE). The amount of data to send or receive may be estimated from buffer sizes and then for example compared to a threshold (e.g., 25% of the maximum buffer size). Further, UEs may be selected in such a way that they have a certain minimum probability of being handed over to an activated pico cell. This can be achieved by excluding UEs which have an uplink RSRP or RSSI with respect to the macro eNB 100 which is above an upper threshold, or by selecting UEs which have an uplink RSRP or RSSI below a lower threshold. Only using a subset of UEs for the measurement also facilitates separating the SRS of the different UEs in the time and/or frequency domain, which in turn means that digital baseband processing is not needed to distinguish the SRS of the different UEs from each other. The SRS monitoring mode may thus be implemented in an energy-efficient manner by keeping the baseband processing part of the pico eNB (e.g., the baseband module 620 of FIG. 6) inactive.

In addition to the signal strength, the measurement report from the pico eNB may include additional information, the frequency domain position of the measured SRS, the time domain position of the measured SRS (e.g., in terms of absolute time or subframe offset), and/or the identity (ID) of the UE, e.g, in terms of an IMSI. These information elements may be used for distinguishing the reported measurements during evaluation by the macro eNB. If the SRS of a certain UE of the subset cannot be measured by the pico eNB, this UE may be ignored in the measurement report.

In an exemplary scenario involving two pico cells (Pico Cell 1 served by Pico eNB 1, and Pico Cell 2 served by Pico eNB 2) and four UEs (with IDs represented by numbers 1 to 4), the measurement reports may include the following information:

Report from Pico eNB 1:

| UE ID | RSRP of SRS (dB) |
|---|---|
| 1 | 10 |
| 2 | 15 |
| 3 | −5 |
| 4 | 20 |

Report from Pico eNB 2:

| UE ID | RSRP of SRS (dB) |
|---|---|
| 1 | 5 |
| 2 | 0 |
| 3 | 15 |
| 4 | −5 |

According to the reported information, the macro eNB may determine the following mapping of the UEs to the pico cells:

Mapping Table at the Macro eNB

| UE ID | Best Pico Cell Candidate |
|---|---|
| 1 | Pico Cell 1 |
| 2 | Pico Cell 1 |
| 3 | Pico Cell 2 |
| 4 | Pico Cell 1 |

In this exemplary scenario, the macro will select Pico Cell 1 for activation because for most of the UEs the RSRP of the SRS at the Pico eNB 2 is stronger than at the Pico eNB 2.

If in another scenario the number of UEs mapping to two different pico cells is equal, additional criteria may be used for selecting one of these pico cells for activation. For example, the pico cell with the highest sum of measured RSRPs could be selected.

Figure 7:
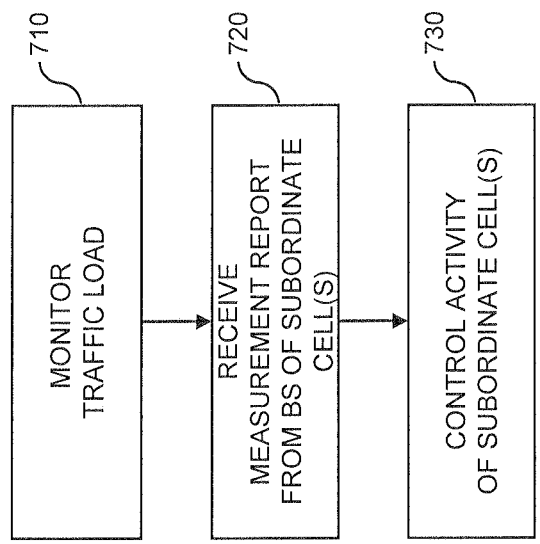
FIG. 7 shows a flowchart for illustrating a method according to an embodiment of the invention, which may be implemented by a base station of a superordinate cell.

FIG. 7 shows a flowchart for illustrating a method of managing cell activity which may be used for implementing the above concepts in a base station which is serving a superordinate cell with one or more subordinate cells being at least partially located within the coverage area of the cell. For example, the method may be implemented by the above-mentioned macro eNB 100, and the subordinate cells may correspond to the pico cells 20-1, 20-2, 20-3 in the coverage region of the macro cell 10.

At step 710, the base station may monitor the traffic load in the superordinate cell served by the base station. If the traffic load is above a threshold, e.g., the above mentioned threshold α, the base station may initiate a process for activation of one of the subordinate cells.

At step 720, the base station receives a measurement report from the a further base station which serves the subordinate cell, e.g., from one of the pico eNBs 200-1, 200-2, 200-3. This may be in accomplished in response to a request from the base station, such as the start monitoring command 304, 305 of FIG. 3. The measurement report indicates a result of a measurement performed by the further base station on an uplink reference signal transmitted by a UE. As mentioned above, this uplink reference signal may be UE specific, e.g., an SRS. The measurement report may in particular indicate an signal strength of the uplink reference signal, e.g., in terms of RSRP or RSSI. The measurement report may also include further information, e.g., indicating an identity of the UE. This indication of the identity of the UE may be explicit, e.g., in terms of an identifier of the UE, or implicit, e.g., in terms of a time and/or frequency domain position of the measured uplink reference signal.

At step 730, the base station controls activity of the subordinate cell. This is accomplished on the basis of the measurement report received at step 720. This controlling of activity of the subordinate cell may for example involve activating the subordinate cell, such that one or more UEs can be served in the subordinate cell. The activation may be performed by sending a command to the further base station, such as the activation request 314. The controlling of activity of the subordinate cell may also involve deactivating the subordinate cell, such that no UEs can be served in the subordinate cell. The deactivation may be initiated by sending a command to the further base station, such as the HO request 410, 506.

The process of activating the subordinate cell may involve switching the further base station from a first mode, in which the further base station is not operable to serve a UE in the subordinate cell, to a second mode, in which the further base station is operable to serve a UE in the subordinate cell. The process of deactivating the subordinate cell may involve switching the further base station from the second mode to the first mode. In the first mode transmit circuitry of the further base station may be inactive. Further, in the first mode receive circuitry of the further base station may be active only temporarily for monitoring the uplink reference signal. Still further, in the first mode a base band processing part of the further base station, such as the baseband module 620 of FIG. 6, may be inactive.

In some implementations, the base station may also receive a further measurement report from another further base station, which operable for serving a further one of the subordinate cells. The further measurement report may be similar to the measurement report of step 820, i.e., indicate a result of a measurement performed by the other further base station on the uplink reference signal transmitted by the UE. The controlling of activity of the subordinate cell in step 830 may then be based on comparing the information from the measurement report to information from the further measurement report, e.g., by comparing RSRPs to obtain a mapping of UEs to subordinate cells.

Figure 8:
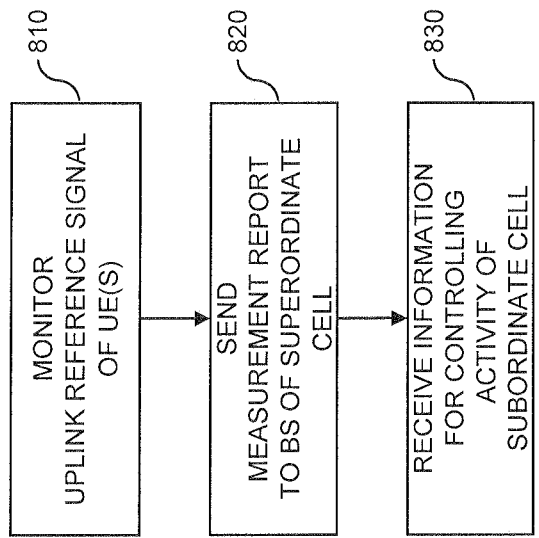
FIG. 8 shows a flowchart for illustrating a further method according to an embodiment of the invention, which may be implemented by a base station of a subordinate cell.

FIG. 8 shows a flowchart for illustrating a method of managing cell activity which may be used for implementing the above concepts in a base station which is operable to serve a subordinate cell which is at least partially located within the coverage area of a superordinate cell. For example, the method may be implemented by one of the above-mentioned pico eNBs 200-1, 200-2, 200-3, and the subordinate cells may correspond to the pico cells 20-1, 20-2, 20-3 in the coverage region of the macro cell 10.

At step 810, the base station monitors an uplink reference signal transmitted by one or more UEs. As mentioned above, this uplink reference signal may be UE specific, e.g., an SRS. The monitoring may be performed on the basis of information in a request to perform this monitoring, such as explained for the start monitoring request 304, 305.

At step 820, the base station sends a measurement report to a further base station serving the superordinate cell. The measurement report may in particular indicate an signal strength of the uplink reference signal, e.g., in terms of RSRP or RSSI. The measurement report may also include further information, e.g., indicating an identity of the UE. This indication of the identity of the UE may be explicit, e.g., in terms of an identifier of the UE, or implicit, e.g., in terms of a time and/or frequency domain position of the measured uplink reference signal.

At step 830, in response to the measurement report, the base station receives information from the further base station for controlling activity of the subordinate cell. This controlling of activity of the subordinate cell may for example involve activating the subordinate cell, such that one or more UEs can be served in the subordinate cell. The activation may be performed by receiving a command from the further base station, such as the activation request 314. The controlling of activity of the subordinate cell may also involve deactivating the subordinate cell, such that no UEs can be served in the subordinate cell. The deactivation may be initiated by receiving a command from the further base station, such as the HO request 410, 506.

The process of activating the subordinate cell may involve switching the base station from a first mode, in which the base station is not operable to serve a UE in the subordinate cell, to a second mode, in which the base station is operable to serve a UE in the subordinate cell. The process of deactivating the subordinate cell may involve switching the base station from the second mode to the first mode. In the first mode transmit circuitry of the base station may be inactive. Further, in the first mode receive circuitry of the base station may be active only temporarily for monitoring the uplink reference signal. Still further, in the first mode a base band processing part of the base station, such as the baseband module 620 of FIG. 6, may be inactive.

It is to be understood that the methods of FIGS. 7 and 8 may be combined in a system which at least includes the base station serving the superordinate cell and the base station which is operable to serve the subordinate cell. In this case, the base station serving the superordinate cell may operate according to the method of FIG. 7, receive the measurement report from the base station operable to serve the subordinate cell, which operates according to the method of FIG. 8, and provide the control information to be used in step 830 of FIG. 8.

Figure 9:
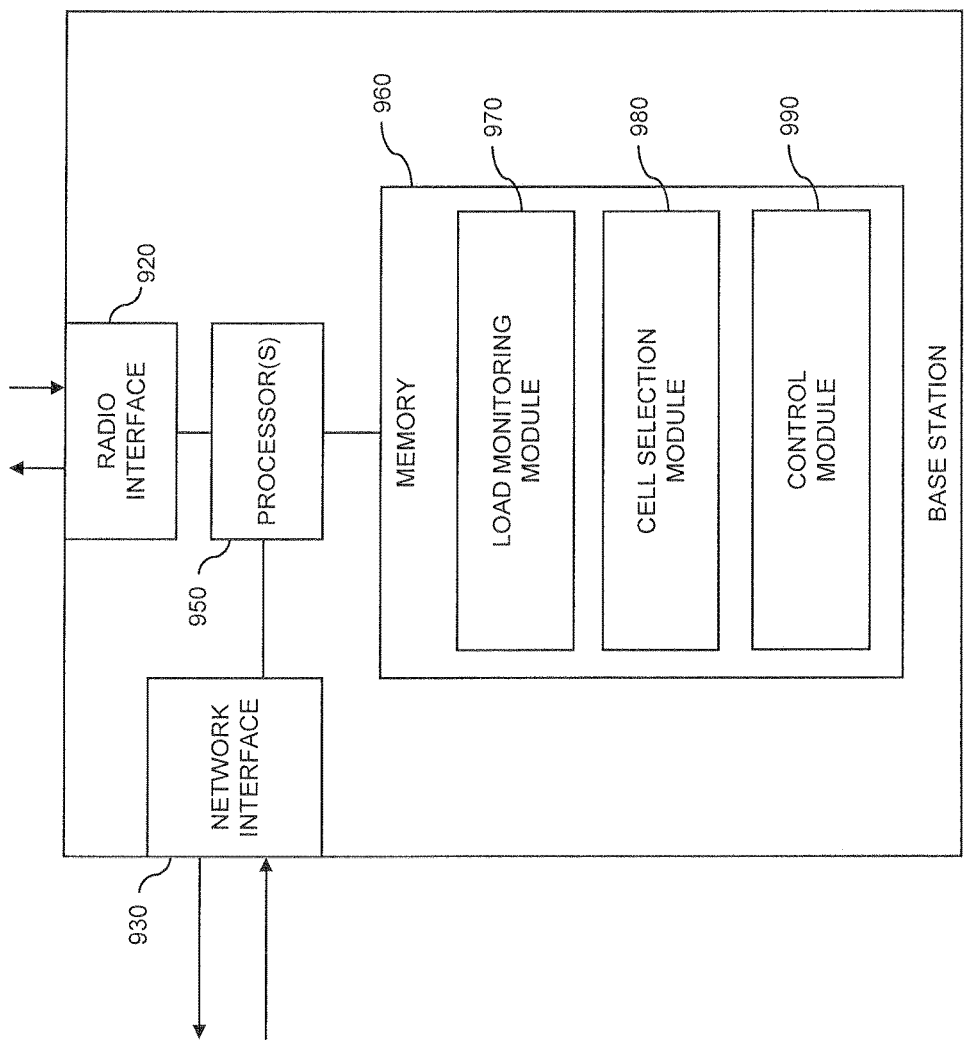
FIG. 9 schematically illustrates a base station of a superordinate cell, which is implemented according to an embodiment of the invention.

FIG. 9 illustrates exemplary structures which may be used for implementing the above concepts in a base station serving a superordinate cell, such as the eNB 100.

As illustrated, the base station a radio interface 920. The radio interface 920 may be used for serving one or more UEs in the superordinate cell. Further, the base station may also be provided with a network interface 930 for connecting to other nodes of the mobile network, e.g., to other base stations. The network interface may for example implement the above-mentioned X2 interface or S1 interface.

Further, the base station includes one or more processors 950 coupled to the interfaces 920, 930, and a memory 960 coupled to the processor(s) 950. The memory 960 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 960 includes suitably configured program code to be executed by the processor(s) 950 so as to implement the above-described functionalities of the base station serving the superordinate cell. In particular, the memory 960 may include a load monitoring module 970 for implementing the above-described functionalities for monitoring the traffic load in the superordinate cell. Further, the memory 960 may also include a system information management module 980 for implementing the above-mentioned functionalities of selecting cells for activation and/or deactivation. Still further, the memory 960 may include a control module 990 for implementing control functionalities, e.g., for generating and processing of messages.

It is to be understood that the structures as illustrated in FIG. 9 are merely schematic and that the base station may actually include further components which, for the sake of clarity, have not been illustrated, e.g., further interfaces or processors. Also, it is to be understood that the memory 960 may include further types of program code modules, which have not been illustrated, e.g., program code modules for implementing known functionalities of an eNB. According to some embodiments, also a computer program product may be provided for implementing functionalities of the base station, e.g., in the form of a physical medium storing the program code to be stored in the memory 960 and/or by making the program code available for download.

Figure 10:
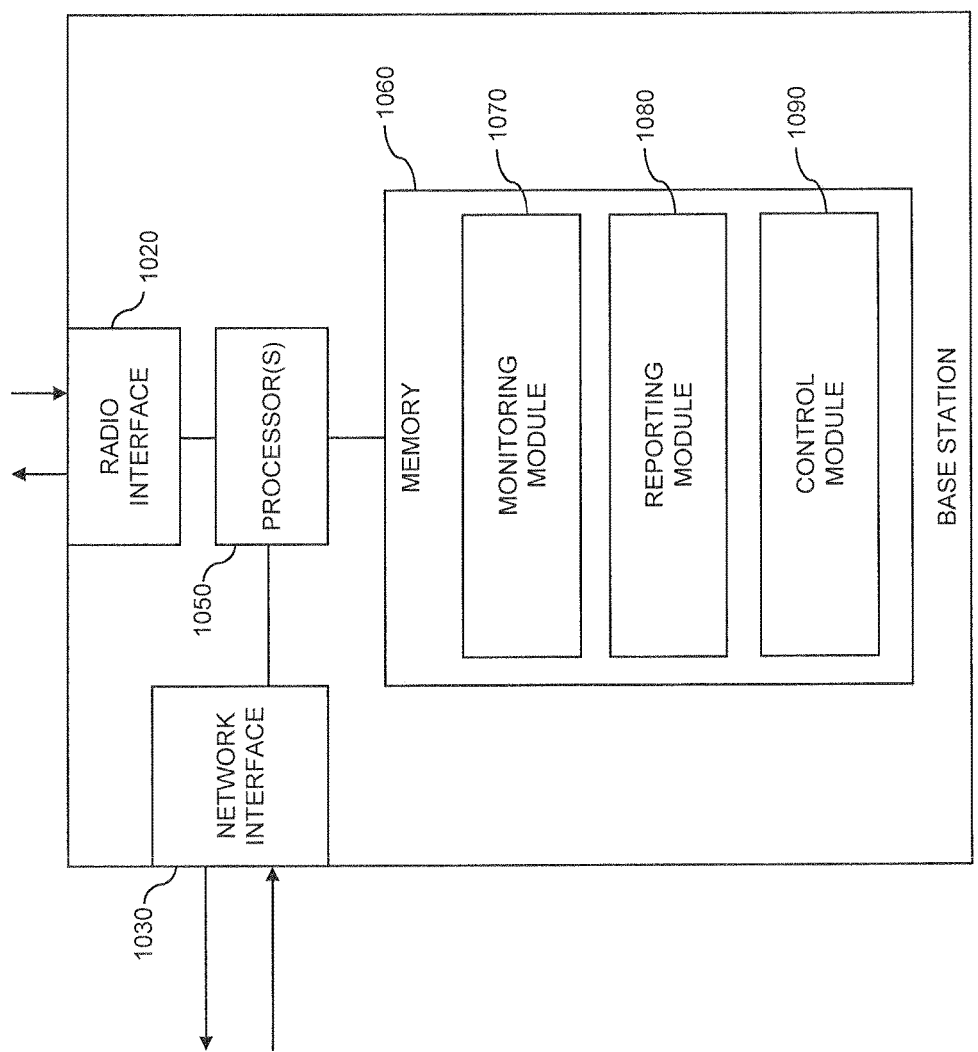
FIG. 10 schematically illustrates a base station of a subordinate cell, which is implemented according to an embodiment of the invention.

FIG. 10 illustrates exemplary structures which may be used for implementing the above concepts in a base station operable to serve a subordinate cell, such as one of the pico eNBs 200-1, 200-2, 200-3.

As illustrated, the base station a radio interface 1020. The radio interface 1020 may be used for serving one or more UEs in the subordinate cell. Further, the base station may also be provided with a network interface 1030 for connecting to other nodes of the mobile network, e.g., to other base stations. The network interface may for example implement the above-mentioned X2 interface or S1 interface.

Further, the base station includes one or more processors 1050 coupled to the interfaces 1020, 1030, and a memory 1060 coupled to the processor(s) 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code to be executed by the processor(s) 1050 so as to implement the above-described functionalities of the base station used for serving a subordinate cell, e.g., of the above-described pico eNB 200-1, 200-2, or 200-3. In particular, the memory 1060 may include a monitoring module 1070 for implementing the above-described functionalities for monitoring the uplink reference signal. Further, the memory 1060 may also include a reporting module 1080 for implementing the above-mentioned functionalities for generating and sending the measurement report. Still further, the memory 1060 may include a control module 1060 for implementing control functionalities, e.g., for generating and processing of messages, for controlling the activity of the subordinate cell by switching to a corresponding operating mode, and for coordinating components of the base station when performing the measurement of the uplink reference signal.

It is to be understood that the structures as illustrated in FIG. 10 are merely schematic and that the base station may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of a base station. According to some embodiments, also a computer program may be provided for implementing functionalities of the base station, e.g., in the form of a physical medium storing the program code to be stored in the memory 1060 and/or by making the program code available for download.

As can be seen, the concepts as described above may be used for efficiently controlling activity of cells in a mobile network. Specifically, selection of a cell to be activated by be performed efficiently, with limited usage of components and energy in the base station serving the candidate cell(s) to be activated. This becomes possible by the usage of the uplink reference signals, which can be monitored and measured without requiring excessive resource usage by the base station. Further, no additional control signaling on the radio interface is required, which allows for achieving efficient usage of radio resources and limiting potential impact on UEs.

It is to be understood that the examples and embodiments as explained above are merely illustrative and susceptible to various modifications. For example, various the measurements of the uplink reference signals may be evaluated in various ways, and various additional criteria may be applied when selecting a cell to be activated or deactivated. Also, the illustrated concepts may be applied in various cell deployments, without limitation to heterogeneous deployments, and with various numbers of subordinate cells. Further, the illustrated concepts may be applied in connection with various radio access technologies or even in deployments which are based on multiple different radio access technologies. Still further the illustrated nodes may be implemented as a single device or by multiple cooperating devices. Moreover, it is to be understood that the above concepts may be implemented by using correspondingly designed software to be executed by one or more processors of an existing device, or by using dedicated device hardware.

The invention claimed is:

1. A method for cell management in a mobile network comprising a cell with one or more subordinate cells at least partially within a coverage region of the cell, the method comprising:

determining that a traffic load at a base station serving the cell is greater than a first threshold;

in response to determining that the traffic load at the base station is greater than the first threshold, requesting a further base station operable for serving one of the subordinate cells to perform measurement on an uplink reference signal transmitted by a user equipment;

receiving, at the base station serving the cell, a measurement report from the further base station, the measurement report indicating a result of a measurement performed by the further base station on an uplink reference signal transmitted by the user equipment;

on the basis of the measurement report, controlling activity of the one of the subordinate cells;

determining that the traffic load at the base station is below a second threshold;

in response to determining that the traffic load at the base station is below a second threshold, obtaining a report of a traffic load at the further base station; and controlling activity of the one of the subordinate cells on the basis of the traffic load at the further base station.

2. The method according to claim 1, wherein said controlling of activity of the subordinate cell comprises activating the subordinate cell.

3. The method according to claim 2, wherein said activating the subordinate cell comprises switching the further base station between a first mode, in which the further base station is not operable to serve a user equipment in the subordinate cell, and a second mode, in which the further base station is operable to serve a user equipment in the subordinate cell.

4. The method according to claim 3, wherein in the first mode transmit circuitry of the further base station is controlled to be inactive.

5. The method according to claim 3, wherein in the first mode receive circuitry of the further base station is controlled to be active only temporarily for monitoring the uplink reference signal.

6. The method according to claim 3, wherein in the first mode a base band processing part of the further base station is controlled to be inactive.

7. The method according to claim 1, wherein said controlling of activity of the subordinate cell comprises deactivating the subordinate cell.

8. The method according to claim 1, wherein the measurement report indicates signal strength of the uplink reference signal.

9. The method according to claim 1, wherein the uplink reference signal is specific for the user equipment.

10. The method according to claim 1, comprising:
the base station receiving a further measurement report from another further base station operable for serving a further one of the subordinate cells, the further measurement report indicating a result of a measurement performed by the other further base station on the uplink reference signal transmitted by the user equipment,
wherein said controlling of activity of the subordinate cell is based on comparing the information from the measurement report to information from the further measurement report.

11. A computer program product comprising a non-transitory computer readable storage medium storing program code to be executed by at least one processor of a base station for a mobile network comprising a cell with one or more subordinate cells at least partially within a coverage region of the cell, wherein execution of the program code causes the at least one processor to perform the steps of a method according to claim 1.

12. The method according to claim 1, wherein the measurement report indicates an identity of the user equipment, and wherein the identity of the user equipment comprises an International Mobile Subscriber Identity associated with the user equipment.

13. The method according to claim 1, wherein controlling the activity of the one of the subordinate cells on the basis of the traffic load at the further base station comprises deactivating the one of the subordinate cells in response to determining that the traffic load at the further base station is less than a third threshold.

14. A base station for a mobile network comprising a cell with one or more subordinate cells at least partially within a coverage region of the cell, the base station comprising:
a radio interface for serving a user equipment in the cell;
a further interface for communication with one or more further base stations operable to serve the subordinate cells; and
at least one processor, the at least one processor being configured to:
measure an uplink signal power of the user equipment relative to the base station;
determine that a traffic load at the base station serving is greater than a first threshold;
in response to determining that the traffic load at the base station is greater than the first threshold, requesting a first further base station operable to serve one of the subordinate cells to perform measurement on an uplink reference signal transmitted by the user equipment;
receive a measurement report from the first further base station, the measurement report indicating a result of a measurement performed by the first further base station on an uplink reference signal transmitted by the user equipment; and
on the basis of the measurement report and the measured uplink signal power, control activity of the one of the subordinate cells;
determine that the traffic load at the base station is below a second threshold;
in response to determining that the traffic load at the base station is below a second threshold, obtain a report of a traffic load at the further base station; and
control activity of the one of the subordinate cells on the basis of the traffic load at the further base station.

15. The base station according to claim 14, wherein said controlling of activity of the subordinate cell comprises activating the subordinate cell.

16. The base station according to claim 15, wherein said activating the subordinate cell comprises switching the first further base station between a first mode, in which the first further base station is not operable to serve a user equipment in the subordinate cell, and a second mode, in which the first further base station is operable to serve a user equipment in the subordinate cell.

17. The base station according to claim 16, wherein in the first mode transmit circuitry of the first further base station is controlled to be inactive.

18. The base station according to claim 16, wherein in the first mode receive circuitry of the first further base station is controlled to be active only temporarily for monitoring the uplink reference signal.

19. The base station according to claim 16, wherein in the first mode a base band processing part of the first further base station is controlled to be inactive.

20. The base station according to claim 14, wherein said controlling of activity of the subordinate cell comprises deactivating the subordinate cell.

21. The base station according to claim 14, wherein the measurement report indicates an signal strength of the uplink reference signal.

22. The base station according to claim 14, wherein the measurement report indicates an identity of the user equipment.

23. The base station according to claim 14, wherein the uplink reference signal is specific for the user equipment.

24. The base station according to claim 14, wherein the at least one processor is configured to:
receive a further measurement report from another further base station operable for serving a further one of the subordinate cells, the further measurement report indicating a result of a measurement performed by the other further base station on the uplink reference signal transmitted by the user equipment,
wherein said controlling of activity of the subordinate cell is based on comparing the information from the measurement report to information from the further measurement report.

* * * * *